E. A. KLUMP.

HOG FEEDER.

APPLICATION FILED SEPT. 6, 1919.

Reissued Feb. 14, 1922.

15,283.

Inventor

Edward A. Klump

By Trickel & Finnegan his Attorneys

UNITED STATES PATENT OFFICE.

EDWARD A. KLUMP, OF BASIL, OHIO.

HOG FEEDER.

15,283. Specification of Reissued Letters Patent. Reissued Feb. 14, 1922.

Original No. 1,303,917, dated May 20, 1919, Serial No. 229,224, filed April 18, 1918. Application for reissue filed September 6, 1919. Serial No. 322,190.

*To all whom it may concern:*

Be it known that I, EDWARD A. KLUMP, a citizen of the United States, residing at Basil, in the county of Fairfield and State of Ohio, have invented a certain new and useful Improvement in Hog Feeders, of which the following is a specification.

This invention while relating generally to feeders for hogs has for its special object to provide an improved construction whereby the feed in the hopper is kept from clogging and the feed in the trough is kept from fouling and from being wasted.

The invention is embodied in the example herein particularly shown and described, the features of novelty being finally claimed.

In the accompanying drawing—

Figure 1:
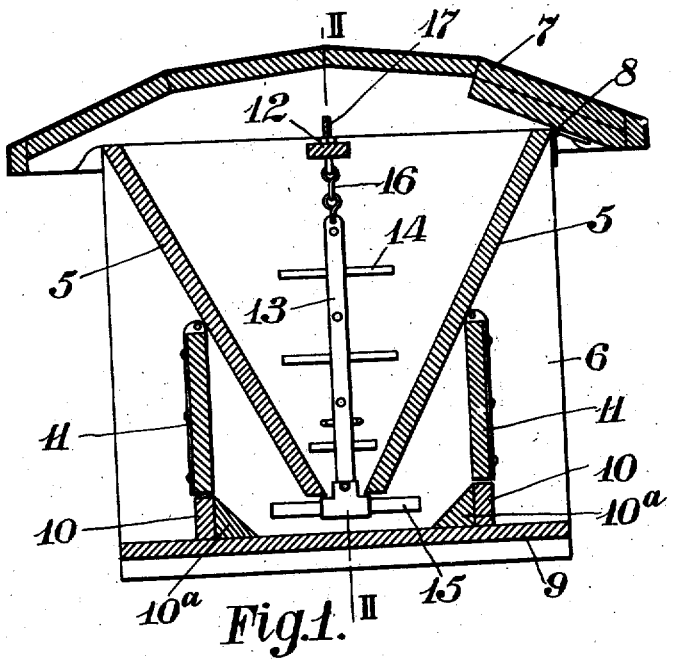
Figure 1 is a transverse vertical section on the line I—I Fig. 2.
Figure 2:
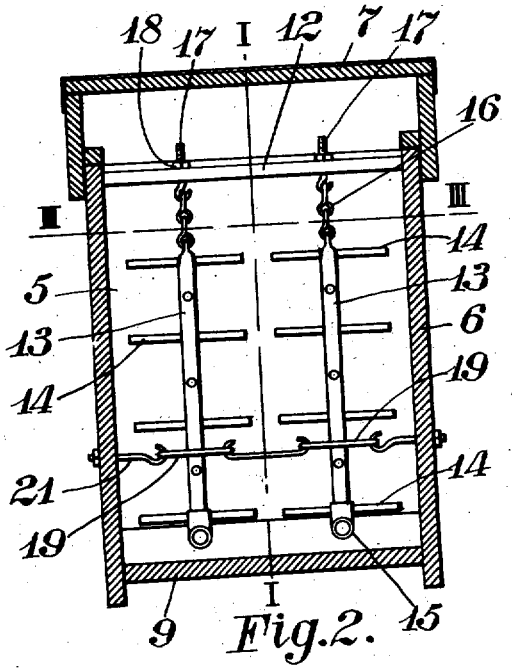
Fig. 2 is a vertical section on the line II—II Fig. 1 with some parts in full.
Figure 3:
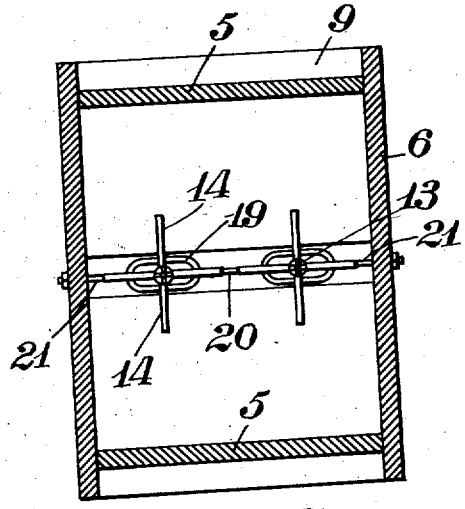
Fig. 3 is a horizontal section on the line III—III Fig. 2 looking down.

In the views 5 designates the inclined walls of the hopper, and 6 the vertical walls between which the inclined walls are secured. 7 is a cover for the hopper, said cover being hinged at 8 so that feed can be supplied to the hopper and the same protected from rain. Somewhat below the outlet of the hopper and supported between the vertical walls 6 is a floor 9. Secured between the vertical walls 6 on the floor 9 beyond the opposite sides of the discharge of the hopper are rails 10 which form a trough to confine the feed to the floor and prevent its loss by scattering. In the corners of the trough between the rails 10 and the floor I secure a strip $10^a$, triangular in cross section with the beveled side out so as to form sloping sides. Hingedly hung from rods extending between the opposite vertical walls 6 above the rails 10 are doors which the hogs must push inward before access to the feed in the trough can be gained. The hog naturally tries to get into a trough with both feet. The sloping sides, however, make an insecure footing and when employed in connection with the doors, as shown, putting the feet into the trough is rendered impracticable because he cannot get both his feet and his head in at the same time. The hog soon learns that he can gain nothing by attempting to put his feet into the trough. Another advantage arising from the construction is that the corners do not become clogged with feed inaccessible to the hog and the trough is kept in a sanitary condition without the necessity of frequent cleaning by the owner.

Secured between the upper ends of the vertical walls 6 is a beam 12 in which the agitator or agitators are secured. The agitator comprises a bar or piece of pipe 13 pierced to receive a series of horizontal cross pieces 14 extending in succession at right angles to each other. The lower end of the bar 13 has secured to it a stout cross piece 15 while the upper end is provided with a chain 16 and bolt 17. The application of a nut 18 to the threaded end of the bolt provides the means for adjustably suspending the agitator to the beam 12, the bolt being passed through a hole in the beam. The parts comprising the agitator are of such combined length that the stout cross piece 15 at the lower end thereof lies below the discharge end of the hopper when the agitator is properly suspended. The hog in feeding moves the stout piece with his snout and this of course swings and rotates or lifts the bar 13 and its cross pieces more or less thereby agitating the contents of the hopper and causing the feed to discharge with proper freedom. To prevent the agitator from being unduly swung I provide an elongated link 19 for each bar 13, the links being connected by a hook member 20 and supported in horizontal position by means of hook bolts 21 secured by nuts in the vertical walls 6. These links, of course, limit the oscillation of the bars 13 and also prevent the agitators—where there is more than one—from interfering with each other.

The forms and proportions of the parts can be changed without departing from the gist of the invention as claimed.

What I claim is:

1. In a hog feeder, the combination with a trough and a hopper having a discharge, a feed agitating device consisting of a rigid structure extending upward into the hopper and including a bar provided with cross bars, one of said cross bars being below the discharge of the hopper, and links directly suspending said rigid structure by its upper end from a fixed point in said hopper whereby the rigid structure may be moved vertically and laterally.

2. In a hog feeder, the combination with a hopper having a discharge, a feed agitating device in said hopper consisting of a rigid upright structure having lateral extensions affixed thereto, one of which is below the discharge of the hopper, and flexible means connected directly to rigid means for suspending said agitating device permitting universal motion including an up and down motion of the upper end thereof.

EDWARD A. KLUMP.